Reissued Apr. 17, 1928. Re. 16,937

UNITED STATES PATENT OFFICE.

SAMUEL ISERMAN, OF SUMMIT, NEW JERSEY, AND WALDEMAR VERNET AND EDMUND QUINCY MOSES, OF NEW YORK, N. Y., ASSIGNORS, BY MESNE ASSIGNMENTS, TO FRANK J. HALL AND L. B. RATTERMANN, OF CINCINNATI, OHIO.

FUEL FOR USE IN INTERNAL-COMBUSTION ENGINES.

No Drawing. Original No. 1,654,259, dated December 27, 1927, Serial No. 727,426, filed July 22, 1924. Application for reissue filed March 10, 1928. Serial No. 260,800.

The present invention is concerned with the provision of a fuel ingredient having improved carbon-removing and preventing qualities and of a fuel containing such ingredient, the same being provided with a coloring material. It also is concerned with the provision of an improved coloring material which will be particularly suitable in coloring gasoline, which will facilitate the use of the carbon-removing ingredient, as well as being of utility when used with a commercial fuel and independently of said ingredient.

We have discovered that the addition of certain ingredients to the motor fuel, especially gasoline, greatly reduces and alleviates the evils due to carbon formation, the materials used being of such nature as to cause the partial or complete elimination of the carbon deposits, and especially of the heavier, tarlike substances formed in the cylinders which serve more or less as a binder for the carbon which is formed and which add to the objectionable quality of the carbon deposit. Further we have observed that the formation of such tarry substances is increased somewhat by the use of gasoline obtained by cracking processes. If the motor is already carbonized when the use of the ingredient is started, the carbon deposit is attacked and wholly or partially removed, thereby greatly improving the condition and increasing the efficiency of the engine.

The ingredients which have been found most suitable and effective fall in the class of the chemically active oxygen bearing cyclic hydrocarbons, especially nitrated aromatic hydrocarbons, and we have discovered that the use of suitable hydrocarbon derivatives of this nature, without the addition of other active ingredients, are effective for the desired purpose. The action of the ingredients may be due primarily to the release of oxygen in the nascent condition from the ingredient itself (due to its decomposition under the temperature and pressure existing in the cylinder) which oxygen directly attacks and oxidizes the heated carbon, or it may be due primarily to a catalytic action of the ingredient or of one of its reaction or decomposition products in activating a part of the oxygen of the air drawn into the cylinder with the fuel charge and thereby causing such oxygen to attack the heated carbon; or to a direct catalytic action of the ingredient or one of its reaction products, or it may be due to a reaction of the ingredient or one of its reaction products directly with the carbon causing its oxidation, or to a combination of the above actions.

In arriving at a fuel ingredient suitable for actual commercial use, it is not only important that it shall be capable of functioning in the desired manner, but it must be also easily obtainable in commercial quantities, and must be inexpensive. Compounds which are available for these purposes at the present time include nitrobenzol, the nitrotoluols and possibly also nitroxylols, nitronaphtlene, and other analogous nitro-compounds. Of course, other cyclic compounds might be found suitable, such as those found in Russian petroleum, by-products of camphor production, by-products of wood, coal and tar distillation, and possibly products in the lignin in waste liquors of the pulp-mill which are capable of nitration. Nitrobenzol and ortho-nitrotoluol are especially available, adaptable and suitable, being liquids at normal temperature, easily nitrated, readily soluble in gasoline and very cheap. We have found that ortho-nitrotoluol is particularly adaptable and is the best substance now known to us for removing and eliminating the carbon deposit, because of its extreme reactivity with the aforementioned tarry substances which apparently cover the deposit in the form of a film and hence protect the interior of the deposit.

Of the materials mentioned nitrobenzol introduced into the gasoline in the proportion of approximately one-tenth of one percent of the gasoline has been extensively used by us, and has been found to prove very satisfactory. We prefer, however, to use ortho-nitrotoluol in quantities equivalent to the specified amount of nitrobenzol, that is to say, about 13.4% more by volume of the ortho-nitrotoluol, giving a proportion of nitrotoluol to the gasoline of about twelve-one-hundredths of one percent. Of course the percentages of the nitro-compounds mentioned as preferable need not be strictly adhered to, but may be more or less increased or diminished depending upon the particular results desired, the nature of the fuels, the character and condition of the carbon deposit, etc. The proportions mentioned, however, have been found highly satisfactory under average running conditions with the present grades of commercial gasoline. The principle should be observed of utilizing the minimum proportion of the ingredient which will function efficiently, and in no case should the ingredient be employed in such quantity that the mechanism of the engine or the operation thereof will be injuriously affected by the ingredient or its reaction products. Without attempting to set absolute limits to the proportion of the ingredient which may be found most suitable under special conditions, it may be stated in general that with nitrobenzol or ortho-nitrotoluol the percentage should ordinarily not be less than five-hundredths of one per cent nor more than five-tenths of one percent, approximately.

The commercial nitrotoluols, especially ortho-nitrotoluol, possess advantages which make them much more desirable for general use than nitrobenzol. Technical ortho-nitrotoluol has a freezing point of approximately −7° C. to −10° C. as against 5° C. for commercial nitrobenzol. This property makes it easier to ship and use with commercial gasoline in cold weather and cold climates. Another exceedingly important advantage of nitrotoluol is the fact that it has substantially the same toxicity as gasoline, so that its use is entirely free from danger which might under some circumstances be attendant upon the employment of nitrobenzol or other compounds of high toxicity. While the use of nitrobenzol in the quantities employed is not at all dangerous to the public, there exists the possibility of injury to those workers mixing and packaging the ingredient. With nitrotoluol, this danger is eliminated. Ortho-nitrotoluol also has a higher boiling point than nitrobenzol and has a greater calorific value than an equivalent quantity of the latter, both of these properties tending to produce more favorable conditions for the elimination of the carbon than in the case of nitrobenzol. Moreover, it is to be especially noted that nitrotoluol does not explode spontaneously either in the manufacture, mixing or packaging as do some of the organic compounds which have been proposed for this purpose. It is also non-corrosive and hence does not attack the containers, carbureters, fuel pipes, auxiliaries, or any of the engine parts, so that it may be used with safety and assurance that no deterioration of equipment will occur.

The ortho-nitrotoluol has been found to be especially active and superior to nitrobenzol in attacking carbon under the conditions of pressure and temperature existing in the cylinder.

We have found that a greater efficiency of combustion is attained when ortho-nitro toluol is used with gasoline as a fuel for internal combustion engines. This is shown by the increase in percentage of carbon dioxide in the exhaust gases, and a corresponding decrease in carbon monoxide.

Another very important feature of our invention consists in the use, with the active carbon attacking ingredient, of a suitable coloring matter which shall be of such character and strength as to color not only the ingredient, but also the gasoline with which the ingredient is mixed so as to give the improved fuel a distinctive color. The use of a proper coloring matter is important for many reasons. In the first place, it makes it possible to assure the proper and thorough mixing of the ingredient with the fuel. Under commercial conditions it is necessary to distribute the ingredient to a large number of fuel dealers or users, most of whom are entirely unskilled in the mixing of liquids and the color is necessary to show whether proper mixing has been obtained. The color is particularly necessary with ingredients such as nitrobenzol and nitrotoluol which are of materially greater specific gravity than gasoline. When, however, the ingredient is suitably and sufficiently colored, improper mixing can be at once detected by the lack of uniformity in the color of the mixed fuel. The proper steps can thus be taken to insure a complete mixture. Another important advantage in the use of a distinctive color is that it enables attempted frauds to be quickly detected and stopped. Such frauds may take the form either of substitution of a spurious ingredient for the genuine or the introduction by the dealer of less than the proper quantity of the ingredient. In either case the color forms a quick practical check by which the fraud can be discovered. This check is particularly effective if a color be used having the characteristics of the colors hereinafter more particularly referred to, to which colorimetric and spectroscopic tests may be readily applied which definitely determine whether the particular color is present in the specified quantity. The color is also very important in enabling the consumer to immediately identify the material and to have the assurance that he is obtaining the ingredient or fuel that he seeks.

A color, to be suitable for the purposes of this invention should possess certain properties, among the most important of which are, that it must be soluble in the ingredient in which it is carried, and also in the gasoline or fuel with which the ingredient is mixed. This is desirable so as to prevent the coloring matter from precipitating or becoming jellylike. The color should also be sufficiently fast, so as not to fade when exposed to light for a reasonable length of time, as when the fuel is sold in the ordinary "visible" gasoline pumps. The color should also be of such stable structure as not to react with the carbon attacking ingredients or with the unsaturated compounds in the gasoline or fuel, so as to cause a change in or destruction of the color. Preferably also the coloring matter used should not be a dyestuff of such a nature as to stain the hands or fabrics with which it may come in contact. The color should also be of such nature as to be pleasing to the eye, and when dissolved in the fuel should be of sufficient intensity so that a very small quantity can be used to treat a large quantity of the fuel and still produce a color sufficiently distinctive to be easily recognized. It is important also that the coloring matter should have no detrimental effect upon the action of the fuel in the engine or upon the action of the carbon attacking ingredient.

We have discovered that anthraquinone derivatives are found to fill all of the above requirements in a most satisfactory manner and are entirely suitable for the present purpose. These colors include either singly, or in combination phenylated amino-anthraquinones, oxyphenyl amino or amino anthraquinones or compounds of anthraquinone containing either amino or hydroxy groups. Of these compounds the ones which we now prefer to employ as most suitable for the present purposes are the diaryl amino anthraquinones and particularly 1.4 toluido anthraquinone. This latter substance, when dissolved in nitrotoluol or nitrobenzol or other solvent such as gasoline in suitable strength and then mixed with the gasoline in the proportions above indicated, of approximately one-tenth of one per cent more or less of the nitro compound to the gasoline, produces a beautiful greenish-blue color which is very attractive to the eye and very distinctive from any other fuel now known. It is possible, by comparison of the color with standard solution, to determine with considerable accuracy whether a standard amount of the ingredient has been mixed with the fuel, and it is also possible, by simple chemical tests to determine whether the proper amount of ingredient has been used. The presence of this particular coloring matter, as distinguished from any imitation thereof, may also be instantly and definitely determined by examining a sample of the colored fuel in a spectroscope. This coloring matter is also not a dyestuff and therefore, the fuel colored therewith will not stain either the hands or fabric, for any fabric which has been saturated with the colored fuel readily washes free thereof. The color may be used in desired proportions depending upon the color effect to be produced, but a suitable strength for producing a satisfactory tint in the fuel is about one per cent in the nitrobenzol or nitrotoluol giving approximately one-thousandth of one per cent in the fuel.

The coloring matter mentioned will also have no deleterious action when introduced with the fuel into the engine but so far as it would have any functional effect would be beneficial. Other colors may of course be utilized but those mentioned appear to be particularly well suited to the purpose of the present invention.

As will be understood from the examples of coloring materials given above, by the expression "a substituted amino anthraquinone" used in certain of the claims is meant an amino anthraquinone in which one or both hydrogen atoms attached to the nitrogen atoms is replaced by another organic radical.

As above stated, the active ingredient, such as nitrobenzol or nitrotoluol, with the addition only of the coloring matter is preferably introduced by itself into the gasoline. In no case should anything be mixed with it which might tend to interfere with its beneficial action or in any way unfavorably affect the operation of the engine. Merely for the purpose of giving the ingredient a little greater bulk so as to facilitate measuring and handling the same when introduced into the gasoline by the consumer, it may be desired to add to the active ingredient a small amount of neutral carrier, preferably a petroleum distillate analogous to the fuel itself, such as gasoline or kerosene. As such diluent will immediately blend with the fuel when added thereto and become virtually a part thereof rather than of the ingredient, it may be employed when desired without injurious effects and without departing from the scope of our invention. Furthermore in some cases a mixture of nitrated aromatic hydrocarbons or other suitable carbon attacking ingredients may be used.

What we claim is:—

1. A fuel ingredient for removing carbon from the cylinders of internal combustion engines, said ingredients containing 1.4 ditoluido anthraquinone as a coloring matter.

2. A fuel for internal combustion engines comprising commercial "cracked" gasoline, orthonitrotoluol and an anthraquinone color.

3. A fuel for internal combustion engines consisting wholly of commercial gasoline, twelve-hundredths of one percent, more or less, of ortho-nitrotoluol and one-thousandth of one percent, more or less, of 1.4 ditoluido anthraquinone.

4. A fuel for internal combustion engines comprising commercial gasoline, a small quantity of 1.4 ditoluido anthraquinone color, and a solvent for said color which is soluble in said commercial gasoline.

5. A fuel for internal combustion engines comprising commercial gasoline, a diaryl amino anthraquinone color, and a solvent for said color which is soluble in commercial gasoline.

6. A fuel for internal combustion engines comprising commercial gasoline and a small quantity of a diaryl amino anthraquinone color.

7. A fuel for internal combustion engines comprising commercial gasoline and a small quantity of 1.4 ditoluido anthraquinone color.

8. A motor fuel comprising a petroleum distillate and as a coloring material a small quantity of an amino or substituted amino anthraquinone.

9. A motor fuel comprising a petroleum distillate and as a coloring material a small quantity of a diamino or substituted diamino anthraquinone.

10. The combination of a petroleum distillate, and, as a coloring material, a small quantity of an amino or substituted amino anthraquinone.

11. The combination of a petroleum distillate, and, as a coloring material, a small quantity of a diamino or substituted diamino anthraquinone.

In testimony whereof, we have affixed our signatures to this specification.

SAMUEL ISERMAN.
WALDEMAR VERNET.
EDMUND QUINCY MOSES.